US005509232A

United States Patent [19]
Laubsch

[11] Patent Number: 5,509,232
[45] Date of Patent: Apr. 23, 1996

[54] PLANTING POT WITH SEPARATELY FORMED ISOLATED POTTING AREAS

[76] Inventor: Judith S. Laubsch, 2727 Shelly Anne Way NE., Salem, Oreg. 97305

[21] Appl. No.: 409,420

[22] Filed: Mar. 24, 1995

[51] Int. Cl.$^6$ ........................................ A01G 25/00
[52] U.S. Cl. .............................................. 47/79; 47/75
[58] Field of Search ........................... 47/79 N, 75 N, 47/81 N, 80, 71

[56] References Cited

U.S. PATENT DOCUMENTS

| | | | |
|---|---|---|---|
| 586,485 | 7/1897 | Guyn | 47/75 N |
| 923,663 | 6/1909 | Kroeger | 47/75 N |
| 3,362,105 | 1/1968 | Steiger | 47/75 N |
| 4,223,480 | 9/1980 | Welty | 47/75 N |
| 5,044,120 | 9/1991 | Couch | 47/79 N |
| 5,103,587 | 4/1992 | Höller | 47/75 N |

FOREIGN PATENT DOCUMENTS

| | | | |
|---|---|---|---|
| 2559024 | 8/1985 | France | 47/80 |
| 814964 | 9/1951 | Germany | 47/80 |
| 323839 | 8/1957 | Switzerland | 47/79 N |
| 82-02327 | 4/1987 | WIPO | 47/75 N |
| 5292839 | 11/1993 | WIPO | 47/75 N |

*Primary Examiner*—Terry Lee Melius
*Assistant Examiner*—Joanne C. Downs

[57] ABSTRACT

A planting pot with separate isolated potting areas including a container having a bottom wall and a side wall extended peripherally upwards from the bottom wall to create a major potting area and an opening for allowing access to the major potting area and a plant receptacle positioned within the major potting area of the container for creating a separate minor potting area for use.

3 Claims, 5 Drawing Sheets

PLANTING POT WITH SEPARATELY FORMED ISOLATED POTTING AREAS

BACKGROUND OF THE INVENTION

1. Field of the Invention

The present invention relates to a planting pot with separately formed isolated potting areas and more particularly pertains to holding or growing a variety of plants with a planting pot with separately formed isolated potting areas.

2. Description of the Prior Art

The use of flower pots is known in the prior art. More specifically, flower pots heretofore devised and utilized for the purpose of holding or growing plants are known to consist basically of familiar, expected and obvious structural configurations, notwithstanding the myriad of designs encompassed by the crowded prior art which have been developed for the fulfillment of countless objectives and requirements.

By way of example, U.S. Pat. No. 255,555 to Smith discloses a combined flower pot, internal support and tubes therefore. U.S. Pat. No. 256,108 to Collie discloses a combined flower pot and saucer or the like. U.S. Pat. No. 256,110 to Dunbar et al. discloses a combined flower pot and saucer or the like. U.S. Pat. No. 3,800,471 to Adams discloses a flower pot with water reservoir. U.S. Pat. No. 5,097,626 to Mordoch discloses an automatic self-watering system for plants growing in a container. U.S. Pat. No. 5,172,517 to Thomsen discloses a plant tube for use in flower pots.

While these devices fulfill their respective, particular objective and requirements, the aforementioned patents do not describe a planting pot with separately formed isolated potting areas that allows a variety of plants to be held, grown, and displayed in a single container.

In this respect, the planting pot with separately formed isolated potting areas according to the present invention substantially departs from the conventional concepts and designs of the prior art, and in doing so provides an apparatus primarily developed for the purpose of holding a variety of plants.

Therefore, it can be appreciated that there exists a continuing need for a new and improved planting pot with separately formed isolated potting areas which can be used for holding a variety of plants. In this regard, the present invention substantially fulfills this need.

SUMMARY OF THE INVENTION

In the view of the foregoing disadvantages inherent in the known types of flower pots now present in the prior art, the present invention provides an improved planting pot with separately formed isolated potting areas. As such, the general purpose of the present invention, which will be described subsequently in greater detail, is to provide a new and improved planting pot with separately formed isolated potting areas and method which has all the advantages of the prior art and none of the disadvantages.

To attain this, the present invention essentially comprises, in combination, a one planter with separate isolated potting areas comprising a bottom wall with an external side wall extended upwardly from the bottom wall at its periphery to create an external planter, the container also having an internal side wall extending upwardly from the bottom wall at an intermediate region thereof to create an internal planter.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved planting pot with separately formed isolated potting areas which has all the advantages of the prior art flower pots and none of the disadvantages.

It is another object of the present invention to provide a new and improved planting pot with separately formed isolated potting areas which may be easily and efficiently manufactured and marketed.

It is a further object of the present invention to provide a new and improved planting pot with separately formed isolated potting areas which is of durable and reliable construction.

An even further object of the present invention is to provide a new and improved planting pot with separately formed isolated potting areas which is susceptible of a low cost of manufacture with regard to both materials and labor, and which accordingly is then susceptible of low prices of sale to the consuming public, thereby making such a planting pot with separately formed isolated potting areas economically available to the buying public.

Still yet another object of the present invention is to provide a new and improved planting pot with separately formed isolated potting areas which provides in the apparatuses and methods of the prior art some of the advantages thereof, while simultaneously overcoming some of the disadvantages normally associated therewith.

Even still another object of the present invention is to provide a new and improved planting pot with separately formed isolated potting areas for holding a variety of plants.

Lastly, it is an object of the present invention to provide a new and improved planting pot with separately formed isolated potting areas comprising a container having a bottom wall and a side wall extended peripherally upwards from the bottom wall to create a major potting area and an opening for allowing access to the major potting area and plant receptacle means positioned within the major potting area of the container for creating a separate minor potting area for use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
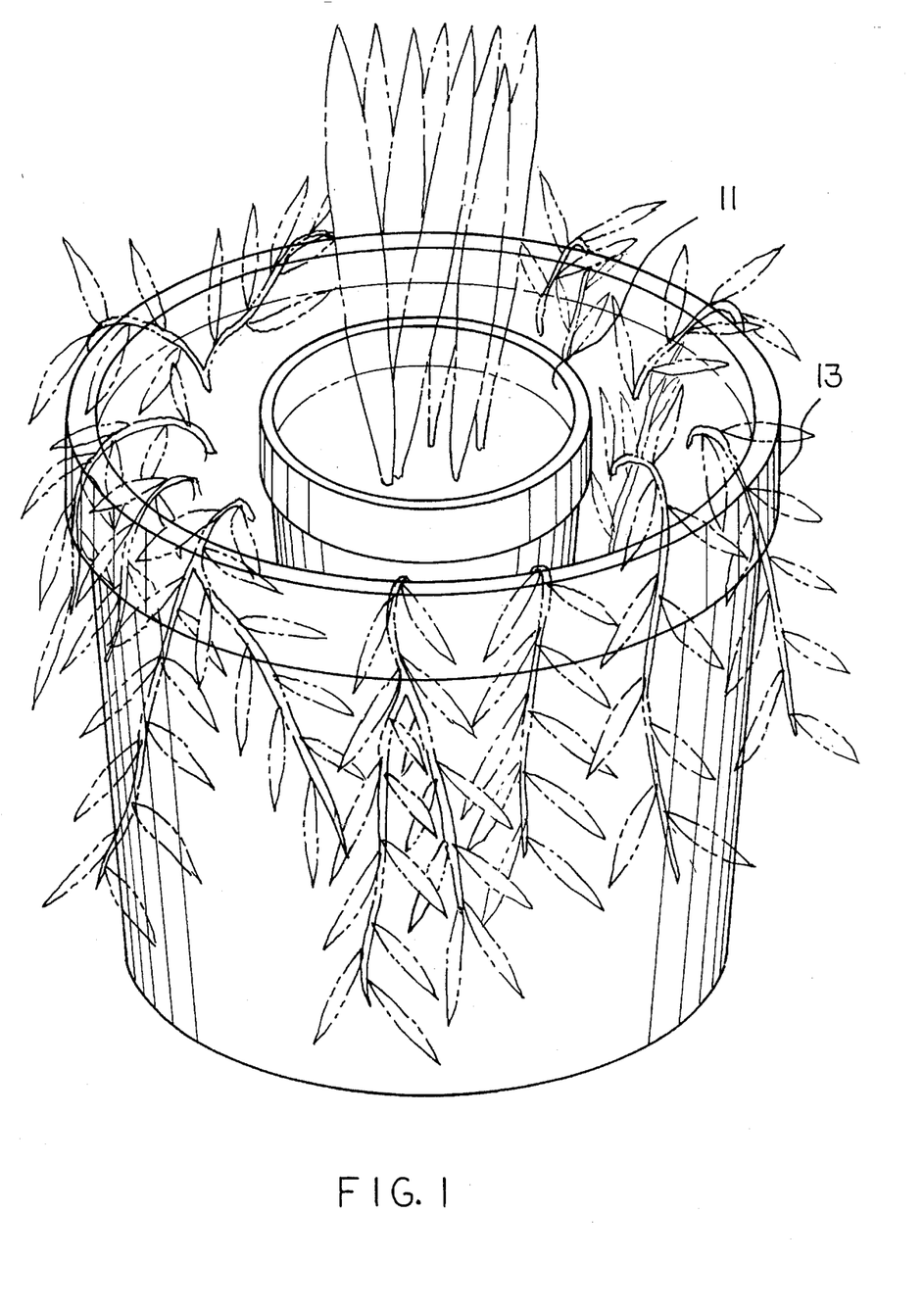
FIG. 1 is a perspective view showing the two in one planter constructed in accordance with the primary embodiment of the invention.
Figure 1A:
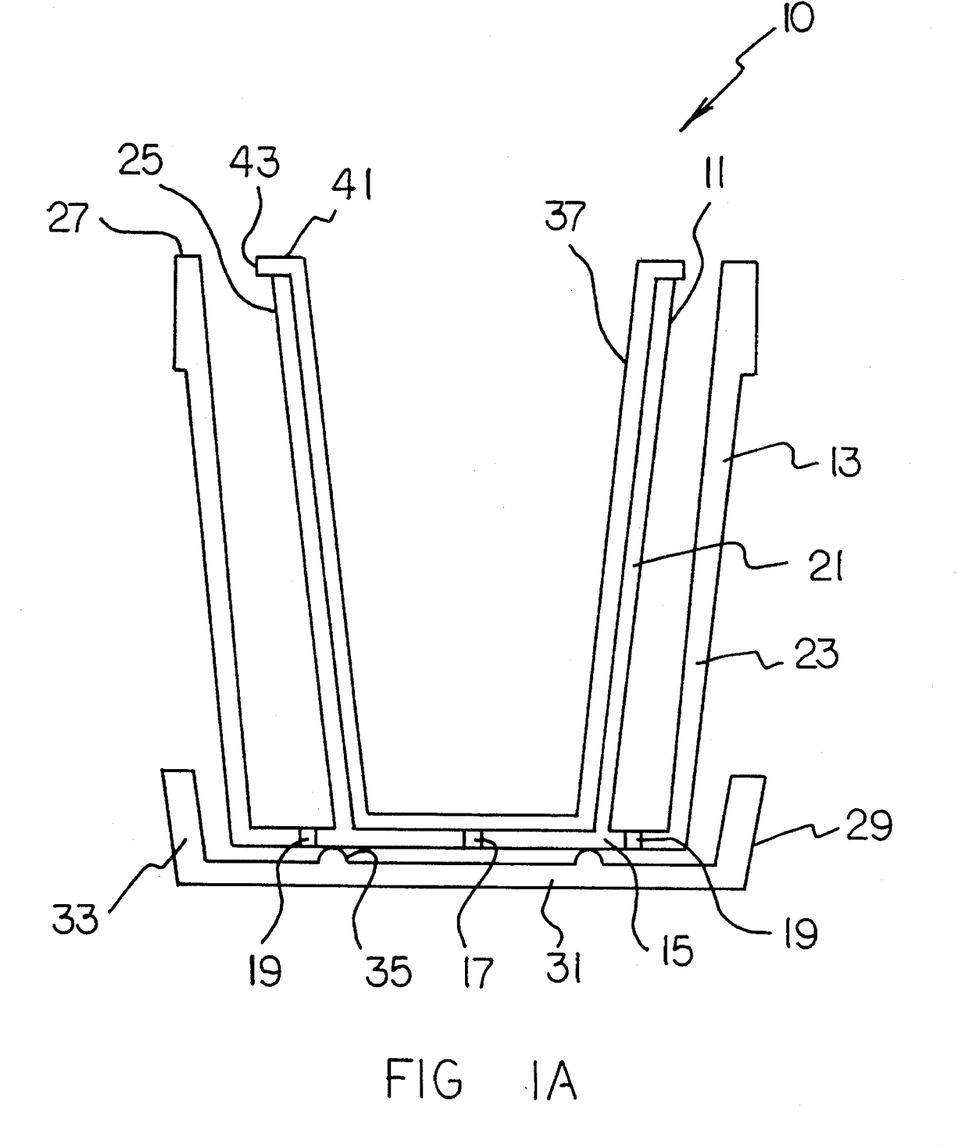
FIG. 1A is a cross sectional view taken vertically through the center of the device shown in FIG. 1 but with the saucer and insert added.

With reference now to the drawings, and in particular, to FIGS. 1 and 1A thereof, the preferred embodiment of the new and improved planting pot with separately formed isolated potting areas embodying the principles and concepts of the present invention and generally designated by the reference number 10 will be described.

The primary embodiment of the present invention involves a two-in-one planter assembly 10. The planter assembly has as its primary components a small inner planter 11 and a large outer planter 13. A common bottom wall 15 therebetween couples the planters 11 and 13 in lateral spaced relationship at their bottoms. The bottom wall 15 is circular and of a planar construction.

A central aperture 17 extends through the bottom wall at a central extent with the inner planter thereabove. A plurality of symmetrically spaced outer apertures 19 are located in the space between the inner and outer planters. The apertures allow drainage in the normal manner.

Figures 3, 4, 5:
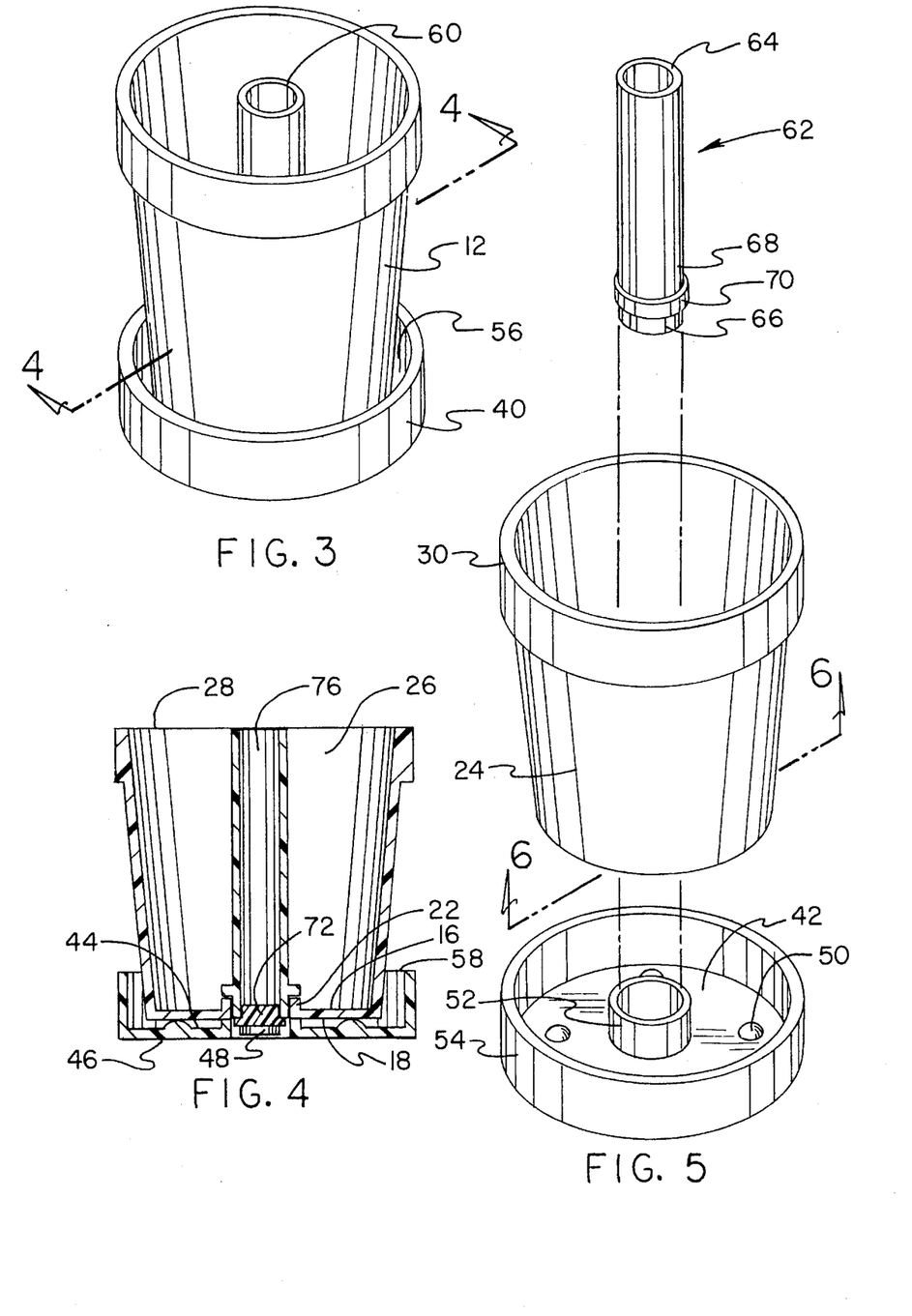
FIG. 3 is a perspective view of the container of the present invention with another type of plant receptacle emplaced therein.
FIG. 4 is a cross-sectional view of the container and plant receptacle taken along the line 3—3 of FIG. 2.
FIG. 5 is an exploded perspective view of the container and plant receptacle.

The inner planter 11 has a side wall 21 which extends upwardly from a central circumferential region of the base. The outer planter 13 has a side wall 23 which extends upwardly from the exterior periphery of the bottom wall. Both the inner and outer planters are provided with circular cross sections in the preferred embodiment. In the preferred embodiment, each of the planters, the inner and the outer planters, are formed in a cone-shaped configuration being smaller adjacent to the bottom wall than at the open tops 25 and 27. By a circular configuration it is also possible that each of the inner and outer planters may be formed of a cylindrical configuration with no taper in the side walls. Note FIG. 4.

The side walls extend upwardly, preferably to an essentially common height. In a typical example, the inner and outer planters may be 5 inches in diameter for the inner planter and 9 inches in diameter for the outer planter. Such are generally conventional sizes. Such diameters are measured at the open top edge of the planters. It should be understood, however, that significantly smaller planters may be readily utilized. Similarly, planters several feet in diameter for industrial and commercial applications could readily be utilized. It is important, however, only that space be available for allowing plants to extend from the outer planter exterior of the inner planter as well as from the inner planter by itself.

It is also preferred that the planter assembly could be provided with a shallow drainage saucer 29 having a diameter greater than the diameter of the bottom wall. Such saucer has an imperforate bottom wall 31 and imperforate upstanding side walls 33 extending only part way up the sides of the planters to retain water therein in a normal fashion. An annular ridge 35 on the upper surface of the saucer raises the planter for allowing drainage.

Dirt or other potting soil may be placed in the outer planter 13 for one type of plant and dirt or other potting soil may be placed in the inner planter 11 for another type of plant. It should be understood that in an alternate embodiment of the invention, no dirt or potting soil be placed in the inner planter 11. In place thereof there is provided an insert 37 having an exterior surface to be received within the interior surface of the inner planter, with the lower surface of the bottom wall located in contact with the upper surface of the bottom wall of the inner planter and with the exterior surface of the side wall of the insert in contact with the interior surface of the side wall of the inner planter.

Such insert 37 is imperforate for retaining water. In such embodiment, cut flowers and water may be positioned and retained within the insert. Such cut flowers would appear to be growing from the inner planter which is supporting the insert. Ready replacement of the insert and its contents is readily facilitated. In the preferred embodiment, the upper edge 41 of the insert 37 is provided with a radially extending flange 43 extending radially beyond the inner planter. This is to assist a user in placing the insert 37 into the inner planter 11 and for removing the insert 37 therefrom. The insert, it may be appreciated, could also be used for dirt or other potting soil with plants and the plants therein could be replaced on a regular basis with minimum effort. The term plant may refer to natural growing flowers, ivy or other vegetation, or in the alternative, artificial variations thereof. The insert 37 and saucer 29 are shown in FIG. 1A.

Figure 2:
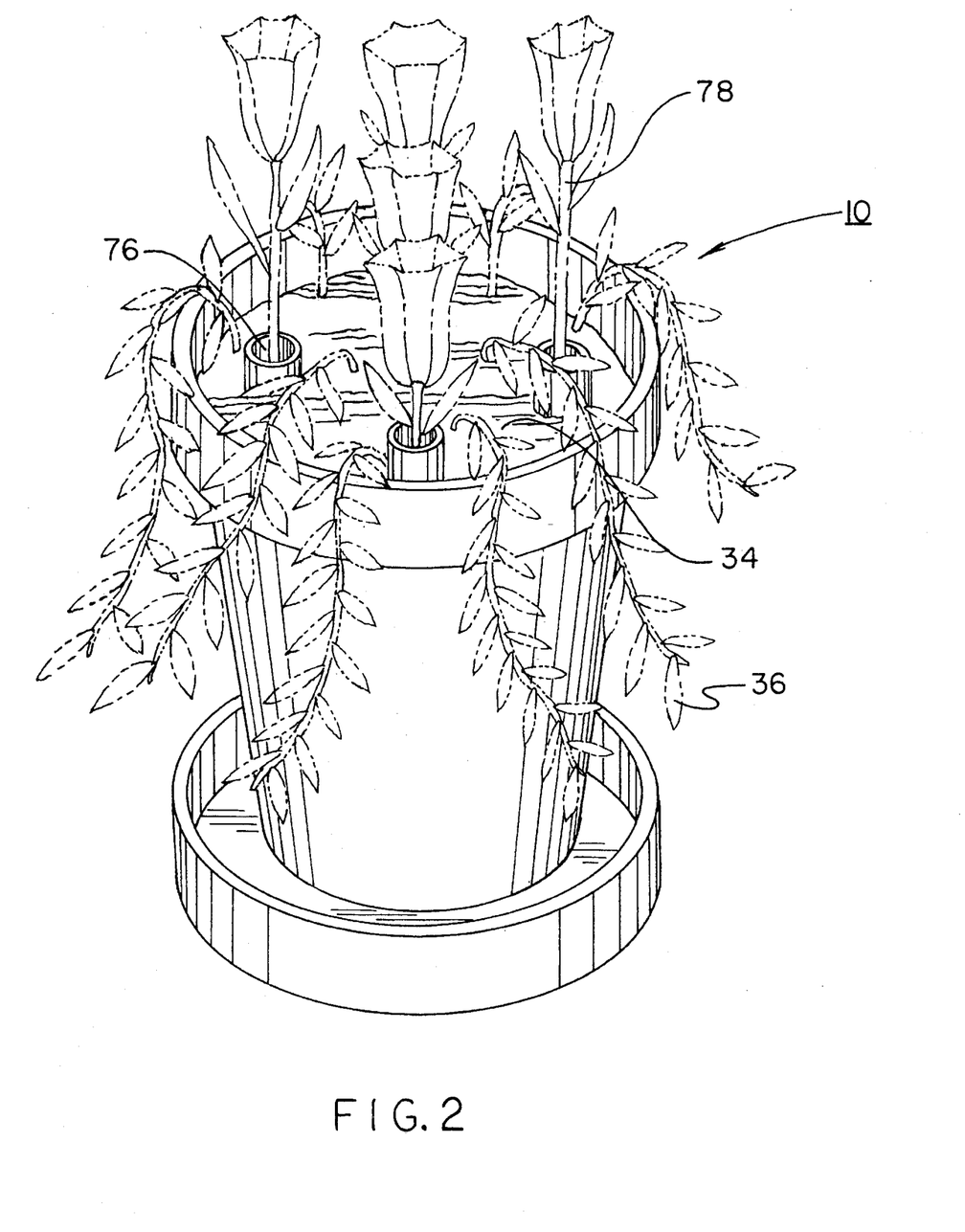
FIG. 2 is a perspective view of an alternate embodiment of the invention with one type of plant receptacle emplaced therein.

In an alternate embodiment of the invention, that illustrated in FIG. 2, the present invention includes a container 12. The container is formed of a rigid material such as plastic. The container has a bottom wall 14 with an upper surface 16 and a lower surface 18. An axially aligned and circular container drain hole 20 is disposed on the bottom wall. An annular collar 22 is coupled to and extended upwards from the upper surface of the bottom wall. The collar is positioned in axial alignment with the container drain hole 20. In addition, the collar bounds the periphery of the container drain hole. A generally tubular container side wall 24 is extended peripherally upwards from the bottom wall. The side wall thus creates a major potting area 26 and a circular container opening 28 for allowing access to the major potting area. The side wall has an axial length greater than the axial length of the collar 22. The container opening 28 has a diameter greater than that of the bottom wall 14. Thus, the side wall 24 tapers upwards and outwards to the container opening 28. The container also includes a peripheral flanged edge 30 extended outwards from the container side wall. This edge 30 bounds the container opening 28. The flange allows a user a firm grip for lifting the container 12. Drainage slots 32 are disposed upon the bottom wall 14 in a circumferential arrangement about the drain hole 20. The drainage slots are in communication with the major potting area 26. The major potting area can be filled with dirt 34 or other potting material for holding and growing plants 36. Excess water disposed within the major potting area can exit from a lower extent of the container through the drainage slots 32.

A saucer 40 is also provided. The saucer is formed of a rigid material such as plastic. The saucer has a circular planar horizontal lower wall with a top surface 44 and a bottom surface 46. An axially aligned circular saucer drain hole 48 is disposed on the lower wall 42. A plurality of raised and dome-shaped protrusions 50 are extended upwards from the top surface 14 of the lower wall in a circumferential arrangement. In addition, the saucer includes an annular flange 52 extended upwards from the top surface 44 of the lower wall. The flange 52 is positioned in axial alignment with the saucer drain hole 48. The flange also bounds the saucer drain hole. A generally tubular saucer side wall 54 is extended peripherally upwards from the lower wall 42 to define a drainage area 56 and a circular saucer opening 58 for allowing access to the drainage area. The side wall has an axial length greater than that of the flange 52. The diameter of the saucer opening 58 is greater than the diameter of the bottom wall 14 of the container 12. Thus, the lower surface 18 of the bottom wall 14 of the container is positionable upon the protrusions 50 of the lower wall of the saucer such that the drain holes 20, 48 are axially aligned. The protrusions 50 create a small spacing between the container 12 and saucer 40 for allowing efficient drainage of water from the major potting area 26 through the drainage slots 32 for collection within the drainage area. The spacing thus helps to ensure that excess water does not remain pooled in a lower extent of the major potting area.

A first plant receptacle 60 is also included. The plant receptacle is formed of a rigid material such as plastic. The plant receptacle includes a tubular body 62. The body has an open upper end 64, an open lower end 66, an elongated intermediate portion 68 therebetween, and an annular flange 70 extended outwards from the intermediate location at a location near the lower end 66. The lower end 66 of the body is slidably frictionally inserted within the collar 22 of the container such that the upper end 64 is positioned flush with the opening 28. When coupled together, the body 62 is axially aligned with the collar 22. The first plant receptacle also includes a plug 72. The plug is slidably, frictionally, and removably inserted within the lower end 66 of the body to thereby create a minor potting area 76 within the body 62. This minor potting area 76 is isolated and separate from the major potting area 26. In addition, the plug 72 is projected outwards and slidable within the saucer drain hole 48 when the container is disposed upon the lower wall 42 of the saucer. The plug positions the container 12 and saucer 40 in general axial alignment and precludes inadvertent movement of the container with respect to the saucer. Since the minor potting area is isolated from the major potting area, it may be used to hold a different variety of plant or different type of potting material. The minor potting area may also be used as a water reservoir for holding and keeping cut flowers 78 fresh.

Figure 6:
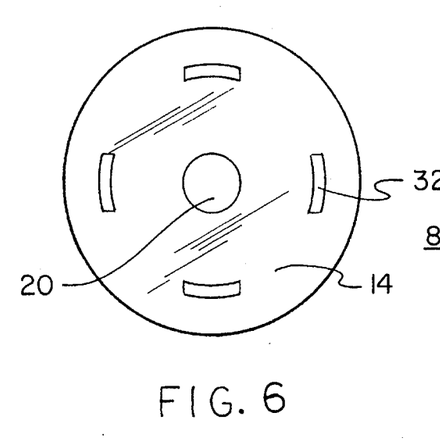
FIG. 6 is a plan view of the bottom surface of the saucer of the present invention.
Figure 7:
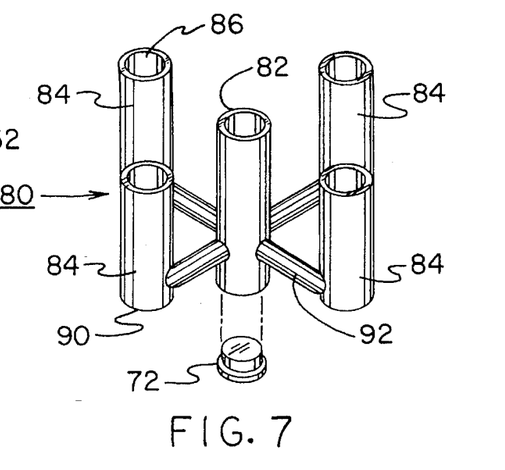
FIG. 7 is perspective view of one of the plant receptacles of the present invention.

A second plant receptacle for use with the container 12 is shown in FIG. 6. This plant receptacle 80 may be emplaced in dirt 34 or other potting material disposed within the major potting area 26 of the container as shown in FIG. 2. The second plant receptacle is formed of a rigid material such as plastic. It includes an upstanding tubular central body 82 and four upstanding tubular outer bodies 84. The size and shape of the central body and outer bodies are identical. The outer bodies are positioned about and in parallel alignment with the central body. Each body has an open upper end 86 and an open lower end 90. The second plant receptacle 80 also includes four straight cylindrical outer spokes 92. The spokes are connected to and extended radially outwards from the central body 82 at a lower extent thereof and connected to the outer bodies 84. Each spoke is perpendicularly positioned with respect to the adjacent spokes. The second plant receptacle additionally includes five plugs 72. The plugs are separately and slidably disposed within the lower ends 90 of the central and outer bodies to thereby create five minor potting areas 76. These areas are isolated and self contained with respect to the major potting area. The minor potting areas 76 may be used for holding a variety of plants in the same fashion as plugged tubular body 62.

Figure 8:
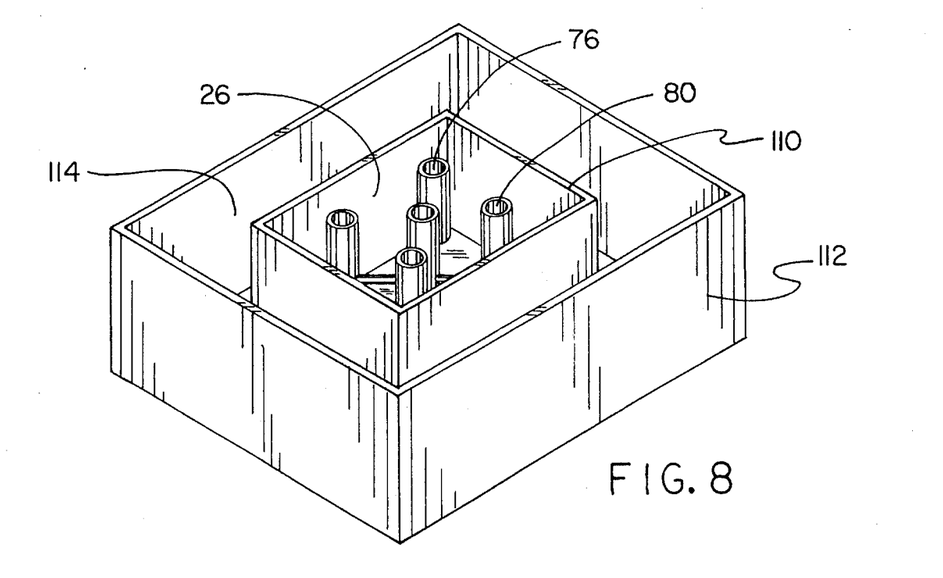
FIG. 8 is a perspective view of another alternate embodiment of the present invention with one of the plant receptacles disposed therein.

Another embodiment of the present invention is shown in FIG. 8. This embodiment includes the second plant receptacle 80 disposed within a generally box-shaped rigid container 110. The container 110 bounds a box-shaped major potting area 26. Furthermore, the container 110 is bounded by a box-shaped outer vessel 112 having a hollow interior of a size greater than the container. The container 110 is removably positioned within the interior of the vessel 112. Thus, another potting area 114 is created and bounds potting areas 26 and 76. The potting area 114 is isolated from potting area 26 and potting area 76.

The receptacles of the present invention could also snap into place and be located off center from the bottom wall of the container. For example, two tubes could be placed within the major potting area and secured to the bottom wall of the container. The different potting areas allow a variety of plants to be potted within a single container. In addition, plants that need more water can be placed in different potting areas than those that do not need as much water. For example, a cactus may be planted in one area, and ivy in another area. Different plants may thus be mixed and matched to provide an aesthetic effect. Furthermore, the receptacles may also be used for holding cut plants such as flowers. A cut flower may be placed within a receptacle, and the receptacle can then be filled with water to keep the cut flower fresh. In addition, a plant such as a fern may be placed within the major potting area as shown in FIG. 1. In this configuration, the present invention may be presented as a gift with the cut flowers highlighting the festive nature of the gift. The flowers can then be removed at a later time without disturbing the potting area of the fern.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A two in one planter with separate isolated potting areas comprising in combination:

a bottom wall with an external side wall extended upwardly from the bottom wall at its periphery to create an external planter, the two in one planter also having an internal side wall extending upwardly from the bottom wall at an intermediate region thereof to create an internal planter, the internal side wall and the external side wall extending upwardly to an essentially common height and having circular cross sections;

the bottom wall being circular and having a central hole for drainage of the internal planter and a plurality of symmetrically positioned holes for drainage of the external planter;

an insert having an exterior surface positioned within an interior surface of the internal planter, the insert being imperforate for the retention of water with cut flowers therein, the insert having an upper edge with a radially extending flange, the flange extending radially beyond the internal planter for assisting insertion and removal of the insert within the internal planter for ready replacement of the insert and the contents thereof; and a circular-saucer being in receipt of the planters with the insert therein, the saucer having a diameter greater than a diameter of the bottom wall, the saucer having an imperforate bottom wall with an annular ridge extending upwardly therefrom, the saucer having imperforate upstanding side walls extending only part way up the sides of the planters for retention of water therein.

2. A planting pot with separate isolated potting areas for holding a variety of plants comprising, in combination:

a container having a circular planar horizontal bottom wall with an upper surface and a lower surface, an axially aligned and circular container drain hole disposed on the bottom wall, a plurality of drainage slots disposed on the bottom wall in a circumferential arrangement about the drain hole, a collar extended upwards from the upper surface of the bottom wall and with the collar positioned in axial alignment with and bounding the container drain hole, a generally tubular container side wall extended peripherally upwards from the bottom wall to create a major potting area and a circular container opening with a diameter greater than the diameter of the bottom wall, and a peripheral flanged edge extended from the container side wall and bounding the container opening;

a saucer having a circular planar horizontal lower wall with a top surface and a bottom surface, an axially aligned circular saucer drain hole disposed on the lower wall, a plurality of raised dome-shaped protrusions extended upwards from the top surface of the lower wall in another circumferential arrangement, a flange extended upwards from the top surface of the lower wall and with the flange positioned in axial alignment with and bounding the saucer drain hole, a generally tubular saucer side wall extended peripherally upwards from the lower wall to define a drainage area and a circular saucer opening with a diameter greater than the diameter of the bottom wall of the container, and with the lower surface of the bottom wall of the container positionable upon the protrusions of the lower wall of the saucer such that the drain holes are axially aligned; and a first plant receptacle including a tubular body with an open upper end, an open lower end, an intermediate portion therebetween, an annular flange extended outwards from the intermediate portion at a location near the lower end and with the lower end thereof slidably inserted within the collar of the container such that the upper end thereof is positioned flush with the opening of the container, the first plant receptacle further including a plug slidably inserted within the lower end of the body to thereby create a minor potting area and with the plug projected within the saucer drain hole when the container is disposed upon the lower wall of the saucer.

3. A planting pot with separate isolated potting areas for holding a variety of plants comprising, in combination:

a container having a circular planar horizontal bottom wall with an upper surface and a lower surface, an axially aligned and circular container drain hole disposed on the bottom wall, a collar extended upwards from the upper surface of the bottom wall and with the collar positioned in axial alignment with and bounding the container drain hole, a generally tubular container side wall extended peripherally upwards from the bottom wall to create a major potting area and a circular container opening with a diameter greater than the diameter of the bottom wall, and a peripheral flanged edge extended from the container side wall and bounding the container opening;

a saucer having a circular planar horizontal lower wall with a top surface and a bottom surface, an axially aligned circular saucer drain hole disposed on the lower wall, a plurality of raised dome-shaped protrusions extended upwards from the top surface of the lower wall in another circumferential arrangement, a flange extended upwards from the top surface of the lower wall and with the flange positioned in axial alignment with and bounding the saucer drain hole, a generally tubular saucer side wall extended peripherally upwards from the lower wall to define a drainage area and a circular saucer opening with a diameter greater than the diameter of the bottom wall of the container, and with the lower surface of the bottom wall of the container positionable upon the protrusions of the lower wall of the saucer such that the drain holes are axially aligned; and a second plant receptacle including an upstanding tubular central body and four upstanding tubular outer bodies positioned about and parallels aligned with the central body and with each body having an open upper end and an open lower end, the second plant receptacle further including four straight outer spokes connected to and extending radially outwards from the central body wherein each spoke is perpendicularly positioned with respect to the adjacent spokes and with each spoke separately connected to one of the outer bodies, the second plant receptacle additionally including five plugs with the plugs separately and slidably disposed within the lower ends of the central and outer bodies to thereby create five minor potting areas.

* * * * *